United States Patent Office 3,170,205
Patented Feb. 23, 1965

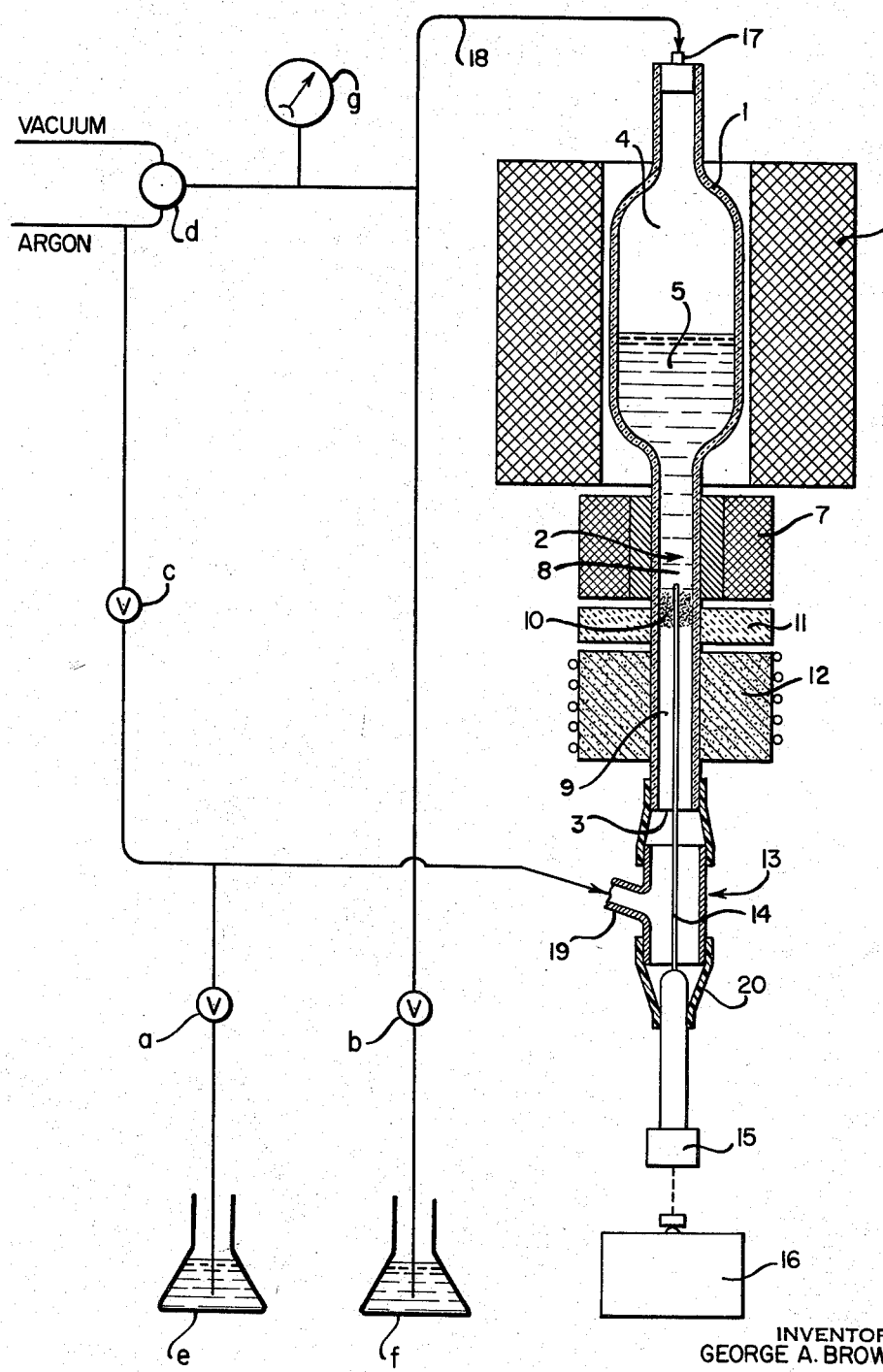

3,170,205
METHOD OF CONTINUOUSLY CASTING THERMOELECTRIC MATERIAL
George A. Brown, Westfield, N.J., assignor to Merck & Co., Inc., Rahway, N.J., a corporation of New Jersey
Filed Aug. 21, 1961, Ser. No. 132,786
3 Claims. (Cl. 22—200.1)

This invention relates to thermoelectric materials and, more particularly, to a method of continuous casting of thermoelectric material in the form of elongated rods.

In the past, thermoelectric materials have been prepared in the form of rods, and the like, by a batch process which involves melting the constituents in a mold of the desired size and shape and slowly crystallizing the melt to form a rod or billet of the material. Such a method is tedious and uneconomical commercially. Therefore, it has been the object of considerable research to provide thermoelectric materials in the form of elongated rods by a continuous process.

Accordingly, it is an object of the present invention to provide a thermoelectric material in the form of an elongated rod.

Still another object of the instant invention is to provide a thermoelectric material in the form of an elongated rod which is produced by a continuous process.

Among the other objects is to provide a continuous casting process for producing thermoelectric rods of extended length having a high degree of mechanical strength and with thermoelectric properties comparable to those produced by batch processes.

These and other objects will be made apparent from the following more detailed description of the invention in which reference will be made to the accompanying drawings in which:

The figure is a schematic illustration of the apparatus of the present invention.

In accordance with the present invention, there is provided a method and apparatus for continuously casting thermoelectric materials in the form of elongated rods. Thermoelectric rods having lengths of 80 feet or more may be continuously cast by this method.

Referring now to the figure, there is shown the continuous casting apparatus of the present invention. What is shown therein is a casting tube 1 having a precision bore zone 2 with an opening 3 at the bottom thereof. The tube has a reservoir 4 for a charge of thermoelectric material 5. The tube is preferably maintained in a vertical position with the thermoelectric material being fed into the reservoir at the top and withdrawn through the opening in the bottom in the form of a continuously-cast rod.

Melting furnaces 6 and 7 surround the reservoir zone 4 and liquid bore zone 8, respectively, to maintain the charge in the liquid state. As the liquid flows past zone 8, it enters a cooling zone whereupon it solidifies, creating a solid zone 9 with a solid-liquid interface 10 therebetween. At the solid-liquid interface there is provided an insulator 11 which separates the heating and cooling sections. The cooling section consists of a water-cooled sleeve 12 which removes heat continuously generated at the interface by the solidification process. The insulating and cooling devices allow the maintenance of a predetermined temperature gradient between the liquid and solid zones of the thermoelectric material. Preferably, the predetermined gradient is rather steep, in the order of 200° C. per centimeter, in order to insure complete and rapid solidification of the material in the solid zone below the interface within the dimensions of the tube itself.

The thus-cast thermoelectric material is then continuously withdrawn from the tube in the form of an elongated rod by means of the withdrawing mechanism generally referred to as 13. The withdrawing mechanism includes a seed rod 14 supported in a seed chuck holder 15 connected to a driving device 16. To assist in continuously withdrawing the cast thermoelectric material from tube 1, a positive pressure exerted by an inert gas 17 is applied to the liquid reservoir through gas line 18. A positive pressure is desirable in that the thermoelectric material itself has a relatively low strength and has a tendency to break when unsupported. Although an external gas pressure is convenient, and therefore preferable, as an alternative a large liquid head of material in the reservoir may be used to provide the desired pressure.

In a typical run, a casting tube is made of quartz having a reservoir section about 4" in length, an inside diameter about ¾", and a precision bore section about 6" in length and about 0.24" inside diameter. The quartz tube is then preferably provided with a carbon coating by passing therethrough an argon stream containing acetone vapors at a total pressure of about 40 to 50 mm. mercury, while the tube is maintained at a temperature of about 900–1000° C. Thereafter, a charge of thermoelectric material, for example a bismuth-selenium-antimony-tellurium composition have the formula $Bi_{24}Sb_{68}Se_6Te_{142}$ of approximately 45 grams, is added in the form of a single slug or several large pieces, and the tube is connected to the gas line. Then the tube is positioned within the furnaces as shown in the figure and a T-connection 19 is attached to the bottom of the precision bore tube. The seed rod is then aligned in a chuck seed holder, pushed through the bottom of a rubber seal and into the quartz tube so that the end extends into the liquid zone 8. Then the chuck is aligned in the withdrawing mechanism, lubricant (Dow Corning Silicone Oil 500) is added through side arm of T 19, and connections are made to the vapor train.

Initially, with valves $a$, $b$ and $c$ closed, the reservoir and tube are alternately evacuated and purged five times with argon, using the three-way valve $d$. Thereafter, a slight positive pressure of argon is maintained on the tube and reservoir with valves $a$ and $b$ open. The argon is allowed to flow out bleeder tubes $e$ and $f$ through an oil seal of about ½" thereby maintaining a pressure in tube and reservoir at slightly above atmospheric.

To start the operation, heaters 6 and 7 and the water flow to cooler 12 are then turned on. After about 12 to 15 minutes, bubbling at $e$ ceases, indicating that a molten seal exists between the top reservoir and the bottom rod. After an additional 10 minutes, whereupon the charge is completely melted, the argon pressure above the melt, indicated on gage $g$, is increased gradually to about 20 p.s.i.g. by increasing the argon pressure in the cylinder and by throttling back on valve $b$ so that a very slow bubbling is obtained. The valve $a$ is opened wide and the valve $c$ is opened carefully to allow a very slight bubbling of argon in $e$ so that an inert gas pressure, of slightly above atmospheric, will be maintained around the seed rod. Now the drive mechanism is activated to the desired withdrawing rate, for example, about 7" per hour. The run then proceeds continuously until the full charge has passed the interface point and has been cast into an elongated rod. At this time, the degree of bubbling of argon in the oil trap $e$ increases, and the pressure in the reservoir decreases, indicating that the full charge has been cast. Then the argon pressure is turned down and the system maintained in an inert atmosphere while cooling. Typically, a ¼" diameter rod, 70' in length, is cast by this process in a 5-day period, using a charge of approximately 4½ kg. of thermoelectric material. The figure of merit, Z, of this material is the same as that produced by batch casting.

In an alternative embodiment, a tube and reservoir fabricated from graphite rather than from quartz, may be used, whereupon the position of the solid-liquid interface is shifted somewhat from the position shown for the quartz tube. As long as the interface remains in a precision bore section, as determined by the heating or cooling sections, operation with this tube is similar to that with the quartz tube.

As described, the process of the present invention is particularly adaptable to thermoelectric materials which have a low thermal conductivity and a low strength. Accordingly, the preferred process herein described for producing thermoelectric rods in a continuous manner in an extended length utilizes a predetermined temperature gradient at a solid-liquid interface and a positive pressure above a liquid reservoir of the material.

While we have described the invention with particular reference to certain preferred embodiments, it will be understood by those skilled in the art that other modifications may be made which are within the scope of the invention.

What is claimed is:

1. In the production of thermoelectric rods in which bismuth and tellurium together constitute more than one-half of the content of the material, with the result that the rods have a thermal conductivity which is extremely low in comparison with the thermal conductivity of metals such as copper and the like, and wherein a suitable mixture of solid is charged to a continuous casting apparatus in which the molten material is withdrawn from the bottom of the molten mixture through a bore within which the liquid-solid interface is to be maintained, the improvement which consists in withdrawing the solid thermoelectric material, in the form of a rod, from the bore at a speed of the order of seven inches per hour.

2. A method of continuously casting a thermoelectric material in which bismuth and tellurium together constitute more than one-half of the content of the material so that the resulting mixture has low thermal conductivity, into a thermoelectric rod of extended length and high strength, which method comprises:
   (a) providing a casting tube having a reservoir at one end and an opening at the other with a bore zone therebetween,
   (b) charging said reservoir with said thermoelectric material,
   (c) heating said material to create liquid material in said reservoir,
   (d) allowing said liquid to flow from said reservoir toward said opening through said bore,
   (e) cooling said liquid in said bore through a predetermined temperature gradient in the order of at least 200° C. per cm. in the direction of travel of the material in said bore, thereby to solidify said material in said bore and to create a solid-liquid interface between said liquid and solid zones in said bore zone, and to completely and rapidly solidify said material below said interface,
   (f) removing heat continuously generated at said interface by said solidification, and
   (g) continuously withdrawing said solid material through said opening at a predetermined withdrawal rate in the order of about seven inches of solid material per hour while said heat is being removed to produce a continuously-cast elongated thermoelectric rod of said material.

3. A method of continuously casting a thermoelectric material in which bismuth and tellurium together constitute more than one-half of the content of the material so that the resulting mixture has low thermal conductivity, into a thermoelectric rod of extended length and high strength, which method comprises:
   (a) providing a quartz casting tube lined with carbon and having a reservoir at one end and an opening at the other with a uniform bore zone therebetween,
   (b) charging said reservoir with said thermoelectric material,
   (c) heating said material to create liquid material in said reservoir,
   (d) applying a positive pressure of inert gas of 20 p.s.i.g. on said liquid,
   (e) allowing said liquid to flow from said reservoir toward said opening through said bore,
   (f) cooling said liquid in said bore through a temperature gradient of 200° C. per centimeter in the direction of travel of the material in said bore, thereby to solidify said material in said bore and to create a solid-liquid interface between said liquid and solid zones in said bore zone and to completely and rapidly solidify said material in the solid zone of the bore below said interface,
   (g) removing heat continuously generated at said interface by said solidification, and
   (h) continuously withdrawing said solid material through said opening at a withdrawal rate of 7 inches per hour while said heat is being removed to produce a continuously-cast elongated thermoelectric rod of high strength of said material.

References Cited in the file of this patent

UNITED STATES PATENTS

| | | |
|---|---|---|
| 2,371,604 | Brennan | Mar. 20, 1945 |
| 2,744,006 | Winter | May 1, 1956 |
| 2,762,857 | Lindenblad | Sept. 11, 1956 |
| 2,814,560 | Ballantine | Nov. 26, 1957 |
| 2,822,308 | Hall | Feb. 4, 1958 |
| 2,955,333 | Berry | Oct. 11, 1960 |
| 2,976,590 | Pond | Mar. 28, 1961 |
| 3,002,320 | Theuerer | Oct. 3, 1961 |